May 27, 1941.   W. H. MUSSEY   2,243,534
LATERAL MOTION TRUCK
Filed Nov. 14, 1938   3 Sheets-Sheet 1
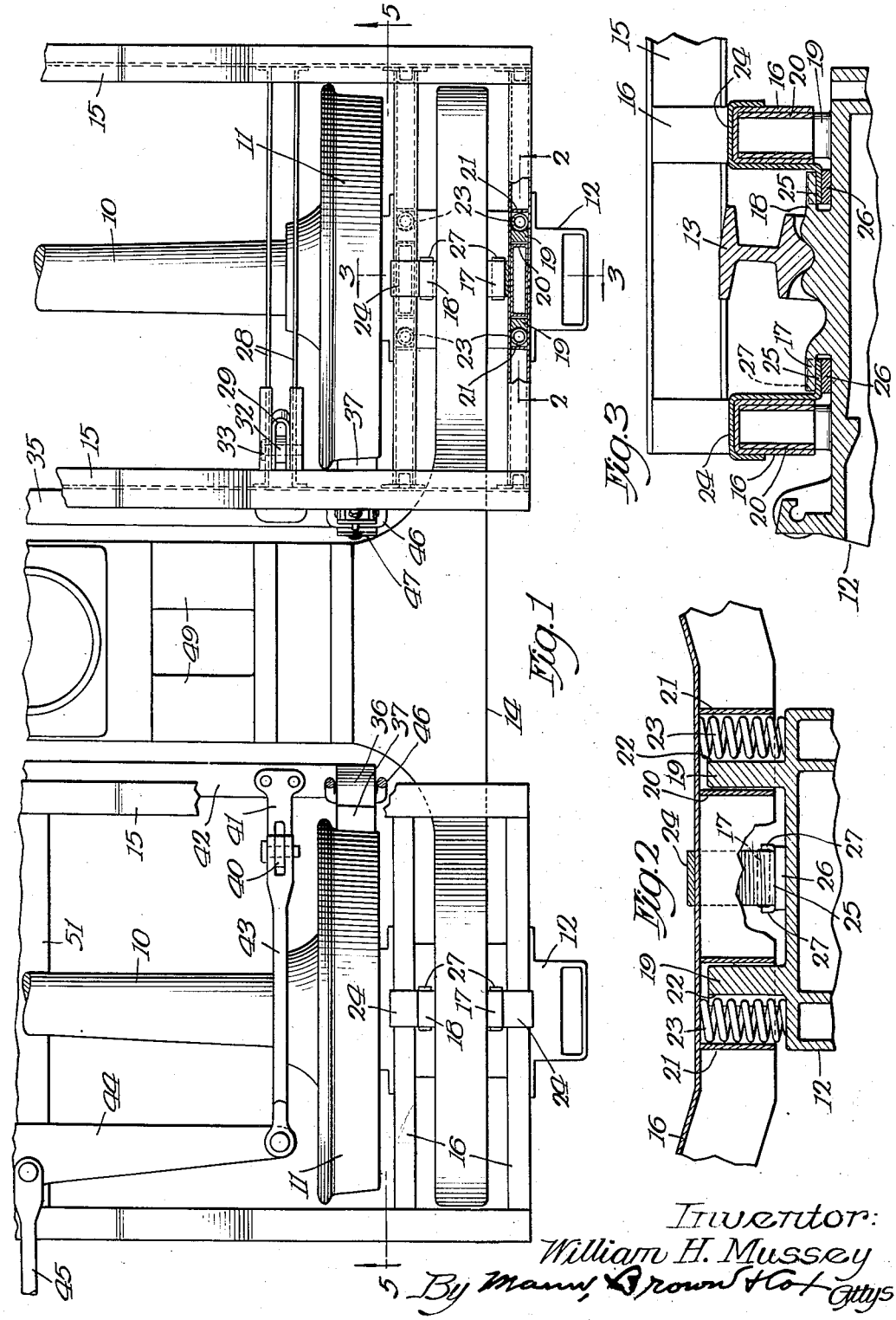
Inventor:
William H. Mussey
By Mann, Brown & Co.
Attys

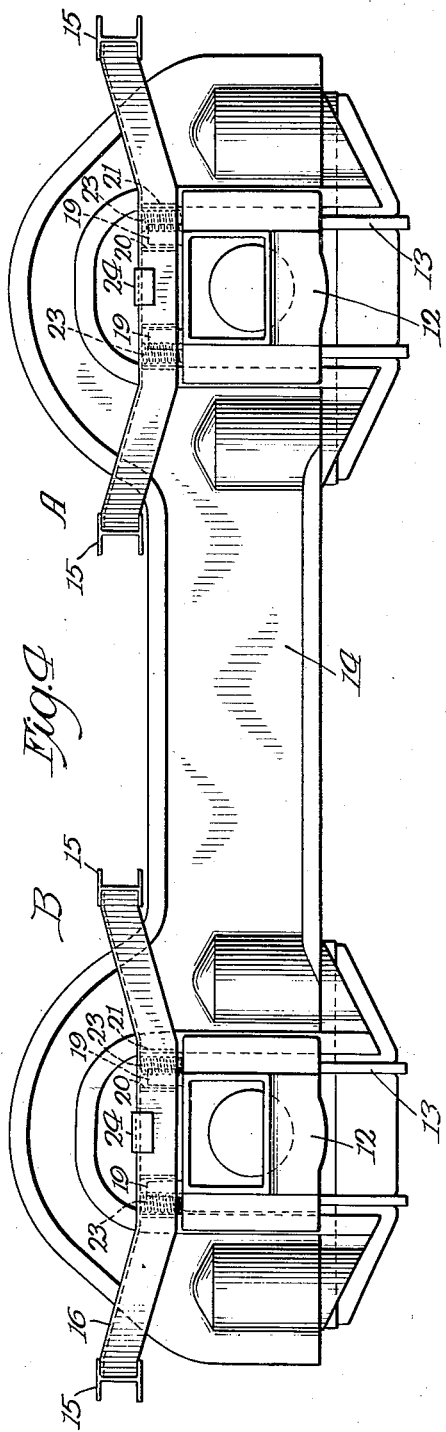
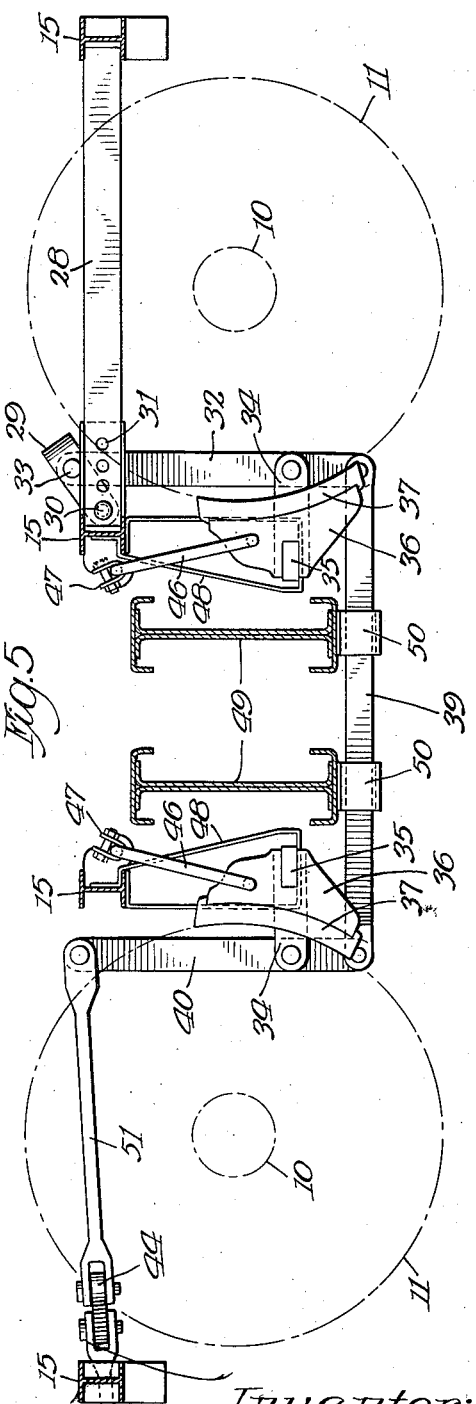

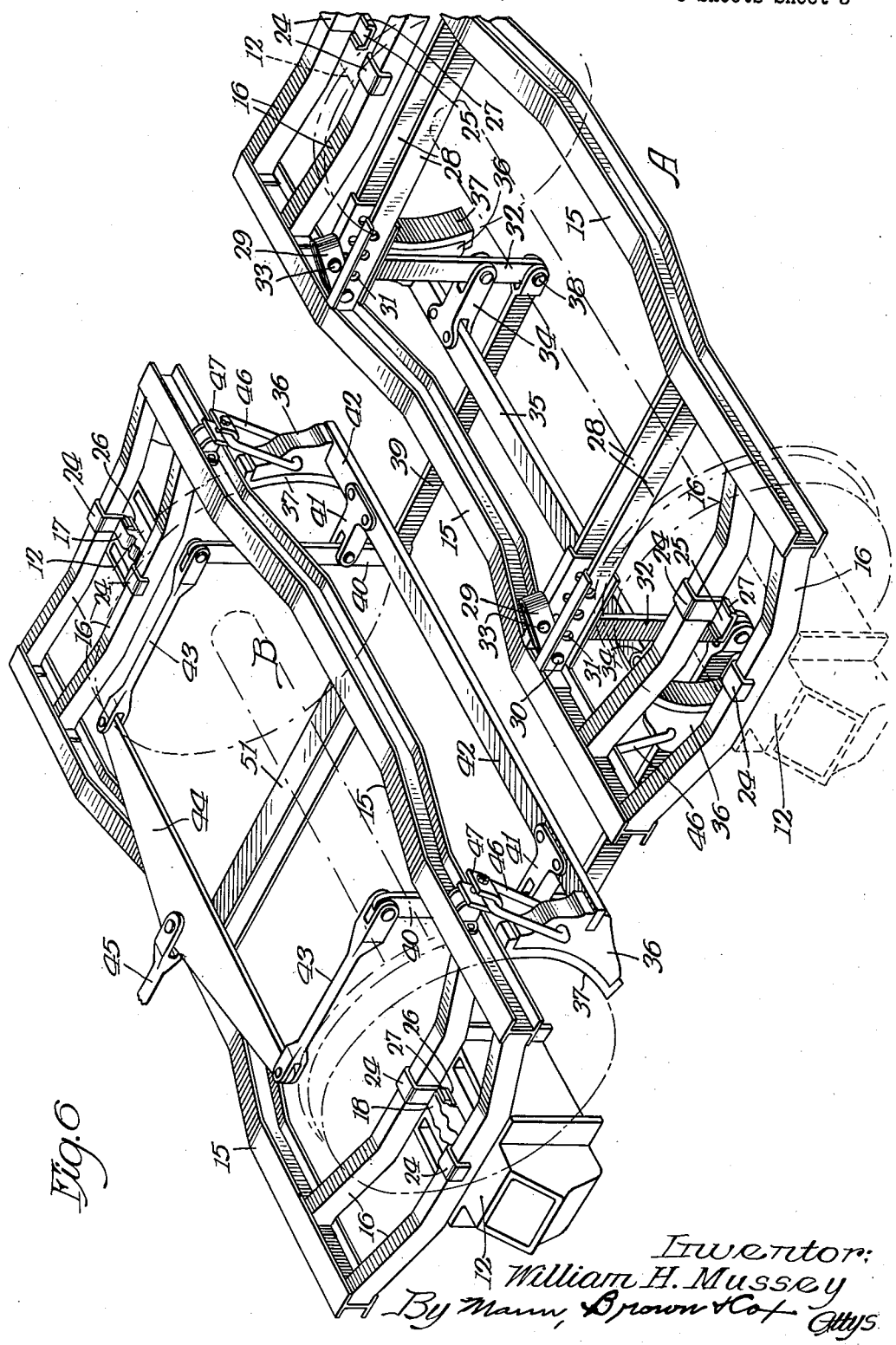

Patented May 27, 1941

2,243,534

UNITED STATES PATENT OFFICE 2,243,534

LATERAL MOTION TRUCK

William H. Mussey, Chicago, Ill., assignor to Pullman-Standard Car Manufacturing Company, Chicago, Ill., a corporation of Delaware Application November 14, 1938, Serial No. 240,212

9 Claims. (Cl. 188—207)

This invention relates to car trucks in which the wheels may move sidewise relative to the truck frame (as in the patent to Carry et al, No. 1,810,876, June 16, 1931, and my copending application, Serial No, 214,673, filed June 20, 1938), and has for its principal object to mount the truck brake gear on the journal boxes for lateral movement with the wheels independently of the truck frame.

According to the preferred scheme each pair of journal boxes is equipped with a brake supporting frame mounted thereon and carrying the brake mechanism on the truck, whereby as each pair of wheels takes lateral motion relative to the truck frame, the corresponding portions of the brake mechanism take similar lateral motion and keep the shoes always aligned with the wheels.

In the drawings—

Fig. 1 is a plan view of approximately half a truck embodying the invention, parts at the right being broken away;

Figs. 2 and 3 are vertical sections taken on the lines 2—2 and 3—3 respectively of Fig. 1;

Fig. 4 is a side elevation of the truck shown in Fig. 1;

Fig. 5 is a section on the line 5—5 of Fig. 1; and

Fig. 6 is a perspective view of the truck brake mechanism.

But these specific drawings and the corresponding specific description are intended for the purpose of disclosure only, whereas the claims are intended to cover all forms in which the invention may be embodied.

This embodiment discloses a four-wheel truck having axles 10, equipped with wheels 11 and journal boxes 12. Yokes 13 on the journal boxes swing the truck frame 14 to allow the wheels, axles and journal boxes lateral movement after the fashion disclosed in my co-pending application, Serial No. 214,673, filed June 20, 1938.

The truck frame 14 is shown as the first form disclosed in my copending application, Serial No. 236,264 filed Oct. 21, 1938, but these features are a matter of choice.

The truck brake mechanism is carried by two supporting frames, generally designated by A and B, quite similar in construction and mounted upon corresponding journal boxes 12.

Each frame A includes two I-beams 15 arched downwardly at the middle and connected by pairs of channels 16, also arched downwardly, as shown in Figs. 4 and 6, to make the beams 15 clear the truck frame 14.

Each journal box (Figs. 2 and 3) has, along the middle, oppositely directed flanges 17 and 18, which might be described as undercut, or overhanging. In proximity to those flanges and to the side edges of the journal boxes are lugs or studs 19, over which the channels 16 telescope. Between the lugs 19 each channel 16 is fitted with a rectangular plug 20 which extends downwardly between the lugs 19, as best shown in Figs. 1 and 2. Spaced from the plug 20 at each side the channels also have partitions 21 which, together with a curved wall 22 of the corresponding lug 19, forms a chamber for a corresponding spring 23. The object of this construction is to interlock the channel bars 16 with the journal boxes to prevent movement either lengthwise or crosswise beyond the limited play necessary for proper working. The springs 23 are to yieldingly support the brake frames on the journal boxes, with limited freedom to move up and down. The frames are made fast by metal straps 24 each hooked over one of the channels 16 and having its lower bent end 25 inserted beneath, or engaged with, the corresponding flange 17 or 18, where it is made fast, by a wedge 26 driven in place and tack welded.

In Figs. 1 and 6 it will be seen that the bent ends 25 of the straps have upturned flanges 27, to cooperate with sides of the flanges 17 and 18. From this it will be seen that each frame A and B rests upon four springs which, in turn, rest upon the journal box, interlocked with the channel 16 against movement in a horizontal plane and held within the desired vertical limits by the straps 24.

Adjacent to each side of the frame A are spaced bars 28 fixed to the beams 15 and equipped with dead lever fulcrum clips 29, adjustably mounted upon pins 30 inserted in selected holes 31 in the bars 28. Each clip 29 is connected to the upper end of a dead lever 32 by a pin 33, and each dead lever 32 is equipped with a brake lever fulcrum 34, the two of which carry a brake beam 35, fitted with brake heads 36, for the shoes 37.

The lower end of each dead lever 32 is connected by a pin 38 with a bottom rod 39, the opposite end of which is, in turn, connected with the lower end of a live lever 40 equipped with a brake lever fulcrum 41, carrying a brake beam 42, also equipped with brake heads 36 and brake shoes 37, for the axle on the side next to the brake cylinder (not shown). The upper end of each live lever 40 is connected to a rod 43 leading to the corresponding end of an equalizing lever 44 connected by a rod 45, directly or indirectly, with the corresponding cylinder lever of the foundation brake gear.

Each brake beam is swung by brake hanger carriers 46, the upper ends of which are received by U-shaped hooks 47, fixed to the corresponding beam 15. The same beam also has brake beam safety hangers 48, secured to and depending from its bottom flange (Fig. 5). Each beam 49 of the transom carries safety hangers 50 for the bottom rods 39.

The frame B does not have the bars 28 for the brake lever fulcrum clip but, instead, has an intermediate cross bar 51, secured at its ends to the middle of each beam 15.

In operation it will be seen that the wheels, together with the axles and journal boxes, may take limited lateral movement relative to the truck frame in negotiating inequalities of the track or turnouts. Each lateral movement of a wheel is accompanied by corresponding lateral movement of the truck brake supporting frame A or B which, in turn, carries along the brake gear corresponding to that wheel and keeps the shoes in proper relation to the tires. A pull on the rod 45 (Fig. 6) thus operates the brake gear to apply the shoes to the wheels, whether one or both the axles has taken lateral movement in the same or different directions with respect to the truck frame.

The brake supporting frames A and B are easily assembled with the journal boxes after the truck frame is in place. The channels 16 fit down on the lugs 19 at each side of the swing yokes and are evenly supported by the four springs 23 and held against undesirable movement by the straps 24.

I claim as my invention:

1. In a car truck, a truck frame, a wheeled axle for said frame, journal boxes on the axle, a brake supporting frame resiliently mounted on the journal boxes, a brake beam, and brake hangers swinging the beam from the brake supporting frame.

2. In a car truck, a truck frame, a wheeled axle for said frame, journal boxes on the axle, a brake supporting frame including a bar transverse to each journal box, spaced springs between the bar and the journal box, and means between the springs for securing the bar to the journal box.

3. In a car truck, a wheeled axle, journal boxes on the axle, a brake supporting frame including a bar transverse to each journal box, spaced springs supporting the bar on the journal box and a strap fastening the bar to the journal box between the springs.

4. In a car truck, a wheeled axle, journal boxes on the axle, a brake supporting frame including spaced bars transverse to each journal box, flanges on the journal box between the bars, a strap hooked over each bar and engaged with one of the flanges on the journal box and resilient means between the box and each bar.

5. In a car truck, a wheeled axle, journal boxes on the axle, a brake supporting frame, including spaced bars transverse to each journal box, oppositely directed flanges on the journal box between the bars, a strap extending over each bar and under the flanges and resilient means between the journal box and each bar.

6. In a car truck, a wheeled axle, a journal box on the axle having a lug on top, a brake supporting frame including a hollow bar receiving the lug and extending crosswise to the journal box, resilient means between the journal box and the bar, and a strap for fastening the bar to the journal box.

7. In a car truck, a wheeled axle, a journal box on the axle, a brake supporting frame including a bar transverse to the journal box and interlocked with it against horizontal movement, resilient means for supporting the bar on the journal box and means to fasten the bar to the journal box.

8. In a car truck, a journal box having a lug on top and a flange in proximity to the lug, a hollow bar crosswise to the journal box over the lug, resilient means for supporting the bar on the journal box and a strap hooked over the bar and under the flange.

9. In a railway car, a truck comprising a truck frame, wheeled axles for supporting said frame, a brake supporting frame for each axle, means for so supporting each of said brake supporting frames from the corresponding axle that each brake supporting frame and the corresponding axle will move laterally together, and the brake supporting frame will have a limited vertical movement independently of the movements of the truck axle, and brake operating mechanism supported by said brake supporting frames.

WILLIAM H. MUSSEY.